United States Patent [19]

Kida et al.

[11] Patent Number: 5,383,031
[45] Date of Patent: Jan. 17, 1995

[54] IMAGE READING APPARATUS

[75] Inventors: Akira Kida; Yasuaki Satoh, both of Hino, Japan

[73] Assignee: Konica Corporation, Tokyo, Japan

[21] Appl. No.: 939,164

[22] Filed: Sep. 2, 1992

[30] Foreign Application Priority Data

Sep. 17, 1991 [JP] Japan .................................. 3-236619

[51] Int. Cl.$^6$ ............................................. H04N 1/00
[52] U.S. Cl. ..................................... 358/444; 358/404; 358/409; 358/487
[58] Field of Search ............... 358/444, 468, 404, 400, 358/471, 409, 474, 487

[56] References Cited

U.S. PATENT DOCUMENTS

5,055,940 10/1991 Tomatsuri ............................ 358/444
5,148,296 9/1992 Takashima ........................... 358/444

Primary Examiner—Edward L. Coles, Sr.
Assistant Examiner—Fan Lee
Attorney, Agent, or Firm—Frishauf, Holtz, Goodman & Woodward

[57] ABSTRACT

An image reading apparatus has a sensing unit to repeat a scanning on an original image with a predetermined time interval between scans so as to obtain a new set of image information data with each scan, a memory unit to store the image information data and a control unit which commands the memory unit to read the image information stored therein. The memory unit has two memory areas, and each of the two memory areas is alternately updated with each scan for storing a set of the image information data. In response to a read command from the control unit, the memory unit starts to read the image information data from one of the memory areas which is not used for storing at the time the command is issued.

6 Claims, 5 Drawing Sheets

IMAGE READING APPARATUS

BACKGROUND OF THE INVENTION

The present invention relates to an image reading apparatus which divides an image on a negative color film into pixels so as to read the image information in the form of digital image information, and which controls the exposure amount properly according to the digital image information or contributes to determine the amount of exposure correction.

In general, a photographic printing apparatus uses an LATD system to control exposure time when a photographic paper is printed from a negative image. In this case, the LATD system is defined as an entire area transmission density control system in which: an amount of light transmitted through a negative film is measured at each color of B, G and R; and from the obtained measurement information, the exposure amount of each color for a photographic paper is controlled to be equal so that a print of appropriate color balance and density level can be provided.

However, the LATD system is based on the following rules of thumb:

(1) A ratio of the average luminance of an entire photographic scene to the luminance of a primary photographic object is statistically constant.

(2) Color balance of B, G and R in a scene is approximately constant, and its average is statistically neutral gray.

Therefore, in the case of a negative film, the luminance distribution and color balance of which are deviated from a statistical average, a desirable print can not be provided.

Therefore, in the highly efficient photographic printing apparatus used at present, an exposure amount is determined in the following manner: a negative image is divided into small pixels; image information characteristic values of each pixel (such as optical transmitting density and/or optical transmitting ratio) are measured; and the exposure amount is determined according to the result of this measurement. Alternatively, according to the result of measurement, the exposure amount determined by the LATD system is appropriately corrected.

The aforesaid apparatus is generally referred to as a scanner. The following 3 kinds of pixel division reading apparatus to read an original image on a negative film can be considered.

TYPE 1

A system to read image information in which an image on a negative film is scanned by mechanical means using a photometric device such as a photodiode.

TYPE 2

A system to read a negative image in which a one-dimensional image sensor such as a linear CCD is disposed right below a negative film running passage so that the negative film can be read synchronously with the conveyance of the negative film, wherein the arrangement direction of the image sensing element is the primary scanning direction and the conveyance direction of the negative film is the auxiliary scanning direction.

TYPE 3

A system in which a two-dimensional image sensor such as an areal CCD is disposed in a position above an exposure stage and the image on a negative film stopped on the exposure stage is sensed.

There is much need for a small and inexpensive photographic printing apparatus which can be installed in a shop such as a photographic shop or a supermarket. In order to reduce the size and cost of the entire apparatus, the system of Type 3 is the most desirable, and actually the use of such a system is spreading widely.

Two-dimensional image sensors used for the aforesaid scanner were originally developed for a video camera, so that its drive circuits packaged as integrated circuits are basically designed for video purposes. Consequently, the image information output is obtained in the form of an analog signal of the video rate (an interlace scanning system in which one screen is composed of so called an odd and an even field). The exposure amount or the exposure correction amount is determined in the following manner: the analog signal of the video rate is digitalized in a sampling circuit; the image information characteristic value of each pixel is successively stored in an image memory so that 2-dimensional digital information is generated; and a CPU (a microprocessor) conducts an operation according to the digital image information so that the exposure amount or exposure correction amount can be determined.

Recently, the performance of photographic developing chemicals has been greatly improved. Accordingly, even when the size of a paper processing apparatus is smaller than that of a prior one, the developing capacity of photographic papers can be improved. For that reason, there is an increasing need for improving the printing capacity of a photographic printer which is a process previous to the paper processing apparatus.

Even though, according to the result of an operation in which the exposure amount or exposure correction amount is obtained by the scanner, the most appropriate exposure amount can not be always provided. In order to obtain a more desirable exposure amount, there is a tendency that the operational process becomes more complicated and a highly sophisticated operation is performed which consumes a large amount of time. That is, it is required to reduce the processing time, and on the other hand, the amount of processing is inevitably increased.

In the case where sampling is conducted on analog image signals of the video rate in order to digitalize the image signals, and the image information characteristic value of each pixel is successively stored into the image memory, a conventional system has been adopted in which the start and end of sampling is controlled synchronously with a vertical synchronization signal, because it is possible to simplify the structure of a circuit relating to the sampling operation by this control system.

However, according to this method, a sampling operation can be started only at the field starting point of a video signal which exists at each 1/60 second. Therefore, even when a command to start sampling is given from the operational side, in a worst case, a sampling operation is substantially started after an amount of time corresponding to one time period has passed, that is after 1/60 second has passed. Further, it is necessary to provide an amount of time of 1/60 second from the start to the end of sampling. Accordingly, at worst, it is necessary to provide the following amount of waiting time from the input of a command to the end of sampling.

$$1/60 \times 2 = 1/30 \ sec = about \ 33 \ ms$$

The aforementioned waiting time of 33 ms greatly affects the processing performance of the scanner.

In general, in a common photographic printer, image exposure is started when an operator presses an exposure button, or when an original negative image conveyed by an automatic negative film conveyance mechanism is stopped at a mask position. For that reason, the image exposure is not synchronized with a scanning period of the video rate of the 2-dimensional image sensor. Therefore, the average sampling time from when sampling is required on the CPU side to when sampling is substantially completed, can be expressed as follows.

$$\begin{aligned}
\text{Average sampling time} &= \text{Average sampling start waiting time + Substantial sampling time} \\
&= (1/60 \ s) \div 2 + (1/60 \ s) \\
&= 3/120 \ s \\
&= 25 \ ms
\end{aligned}$$

In the latest photographic printing apparatus, the scanner is allowed to spend about 100 ms for classifying a negative image. However, this processing time is expected to be reduced, for the reasons mentioned before. However, in the average waiting time (25 ms) in which sampling is conducted on image information, image processing operations can not be carried out at all. Accordingly, it is clear that the waiting time is a chief obstacle to the reduction of the negative film classification time.

In order to solve the aforesaid problem, it is known that the following methods are effective.

(1) A very complicated sampling circuit is composed so that a sampling operation can be started and ended at any point.

(2) An expensive device such as a dual port RAM is utilized so that the writing onto an image memory by a sampling circuit is conducted in parallel with the reading of image memory by the CPU.

When the aforesaid methods are adopted, the hardware becomes complicated, and further the cost is raised. Accordingly, the aforesaid methods can not be put into practical use.

SUMMARY OF THE INVENTION

The present invention has been achieved to solve the aforesaid problems. It is a primary object of the present invention to provide an image reading apparatus in which the waiting time for image reading can be greatly reduced even when the structure is as simple as that of a conventional apparatus.

In order to accomplish the aforesaid object, the present invention provides an image forming apparatus of a first structure, comprising an image sensing section which conducts an image sensing operation on a 2-dimensional scanned image such as a film at a regular period; a memory section which stores digital image information of the image which has been sensed; and a control section which gives a command for reading to the memory, wherein 2 fields of image memory by which the image information can be alternately renewed, is provided in the memory section, and when a reading command is sent out from the aforesaid control section, image information is read out from the image memory on which a writing operation is not being conducted. In the aforesaid manner, waiting time is substantially made to be zero during an image information reading process.

When the image memory 3, the capacity of which corresponds to 3 or more fields, is provided, and the image memory is sequentially changed over, the waiting time can also be reduced to zero. However, from the viewpoint of efficiency, the composition of the image memory, the capacity of which corresponds to 2 fields, is desirable.

The present invention provides an image forming apparatus of a second structure, comprising an image sensing section which conducts an image sensing operation on a 2-dimensional scanned image such as a film at a regular period; a memory section which stores digital image information of the image which has been sensed; and a control section which gives a command of reading to the memory, wherein 1 field of image memory by which the image information can be renewed at each raster, is provided in the memory section, and when a reading command is sent out from the control section, the reading of the image memory is started in accordance with the sampling end signal of raster information which is being renewed. In the aforesaid manner, waiting time to read out image memory is made to be a period of time corresponding to sampling time of 1 raster at the longest.

The present invention provides an image forming apparatus of a third structure, comprising an image sensing section which conducts an image sensing operation on a 2-dimensional scanned image such as a film at a regular period; a memory section which stores digital image information of the image which has been sensed; and a control section which gives an reading command to the memory, wherein 1 field of image memory by which the image information can be renewed at each field is provided in the memory section, and when a reading command is sent out from the control section, reading of the image memory is started in accordance with the sampling end signal of field information which is being renewed. In the aforesaid manner, waiting time to read out the image memory is made to be a period of time corresponding to a sampling time of 1 field at the longest.

The image memory is provided with an image information protection means which can be operated by the reading-out command, so that interference between the control section and the sampling means can be prevented.

The control section calculates an exposure amount or an exposure correction amount in the process of photographic printing according to the digital image information so that the image processing speed can be increased in a photographic printing apparatus.

In the first structure of the present invention, the image sensor section always conducts sampling on an original image such as a photographic film at a predetermined period, for example, at a period of 1/60 second, and at the same time, the image sensor section records 1 field of image memory alternately in the first and the second memory. When an image reading-out command is sent from the control section, the image information in the memory which is not in a writing operation at present, that is, the image information on which sampling has been conducted immediately before, is read out and processed as the data relating to printing exposure control. Therefore, from the viewpoint of control, the waiting time for sampling is substantially zero.

In the second structure of the present invention, the image sensor section always conducts sampling on an original image such as a photographic film at a predetermined period, for example, at a period of 1/60 second, and at the same time, the image memory in which 1 field of image memory is stored, is renewed at each raster. When an image reading-out command is sent out from the control section, the image information is read out from the image memory immediately after the completion of raster writing (synchronously with the horizontal synchronizing signal), and the obtained information is processed as the data relating to the control of the exposure amount. Therefore, from the viewpoint of control, the waiting time for sampling is a period of time corresponding to 1 raster sampling at the longest (on average, ½ raster time).

In the third structure of the present invention, the image sensor section always conducts sampling on an original image such as a photographic film at a predetermined period, for example, at a period of 1/60 second, and at the same time, the image memory in which 1 field of image memory is stored, is renewed at each field. When an image reading-out command is sent out from the control section, the image information is read out from the image memory immediately after the completion of field writing (synchronously with the vertical synchronizing signal), and the obtained information is processed as the data relating to the control of the exposure amount. Therefore, from the viewpoint of control, the waiting time for sampling is a period of time corresponding to 1 field sampling at the longest (on average, ½ field time).

In the first, second and third structures, the image protection means is operated in accordance with the reading-out command signal. Accordingly, access from the sampling means to the memory is prohibited, so that the content of the memory is maintained unchanged, and the consistency of digital information provided for calculation in the control section can be ensured.

In this case, a video signal of interlace scanning is utilized and the signal is processed at each field (½ frame). However, in the case of a signal processing system in which a signal is processed at each frame, the signal can be processed at high speed by the same structure.

BRIEF DESCRIPTION OF THE DRAWINGS

FIG. 3-a is a schematic illustration showing the principle of the first structure of the apparatus of the present invention;

FIG. 3-b is a schematic illustration showing the principle of the first structure of the apparatus of the present invention;

FIG. 4-a is a schematic illustration showing the principle of the second structure of the apparatus of the present invention;

FIG. 4-b is a schematic illustration showing the principle of the second structure of the apparatus of the present invention;

FIG. 5-a is a schematic illustration showing the principle of the third structure of the apparatus of the present invention; and FIG. 5-b is a schematic illustration showing the principle of the third structure of the apparatus of the present invention.

DETAILED DESCRIPTION OF THE PREFERRED EMBODIMENTS

With reference to the attached drawings, an embodiment of the present invention will be explained as follows.

Figure 1:
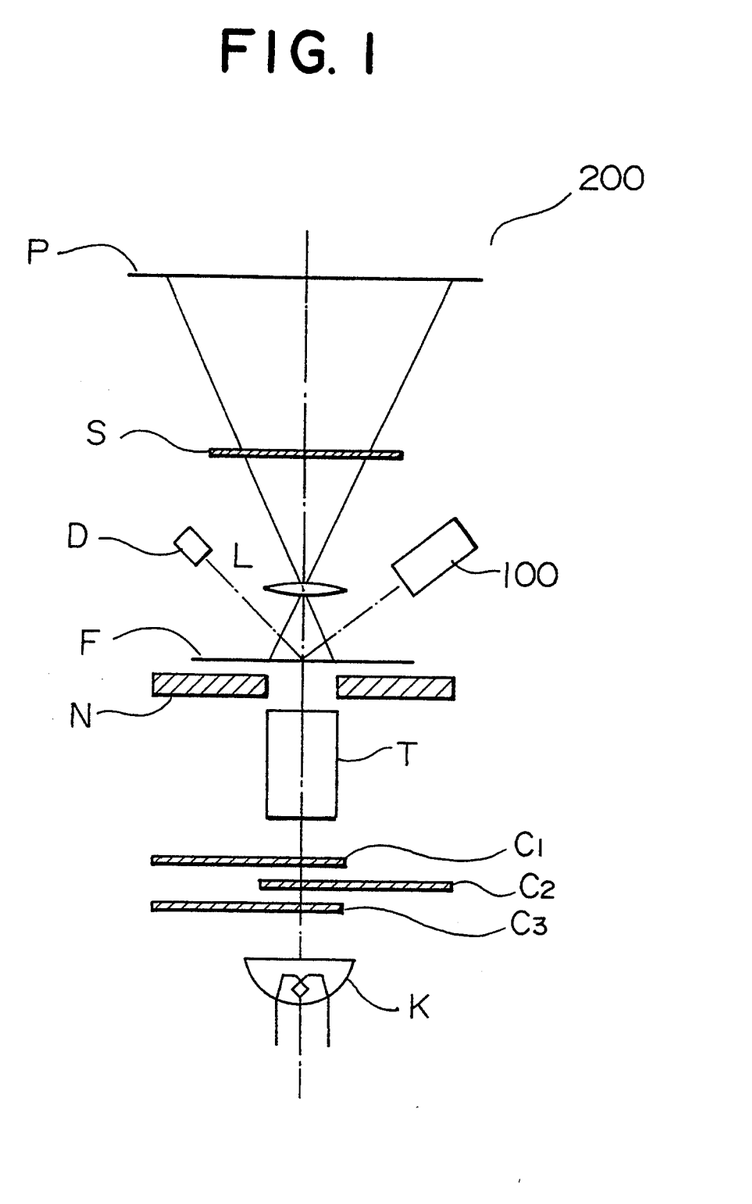
FIG. 1 is a schematic illustration showing the principle of a photographic printing apparatus to which the image reading apparatus of the present invention is applied.
Figure 2:
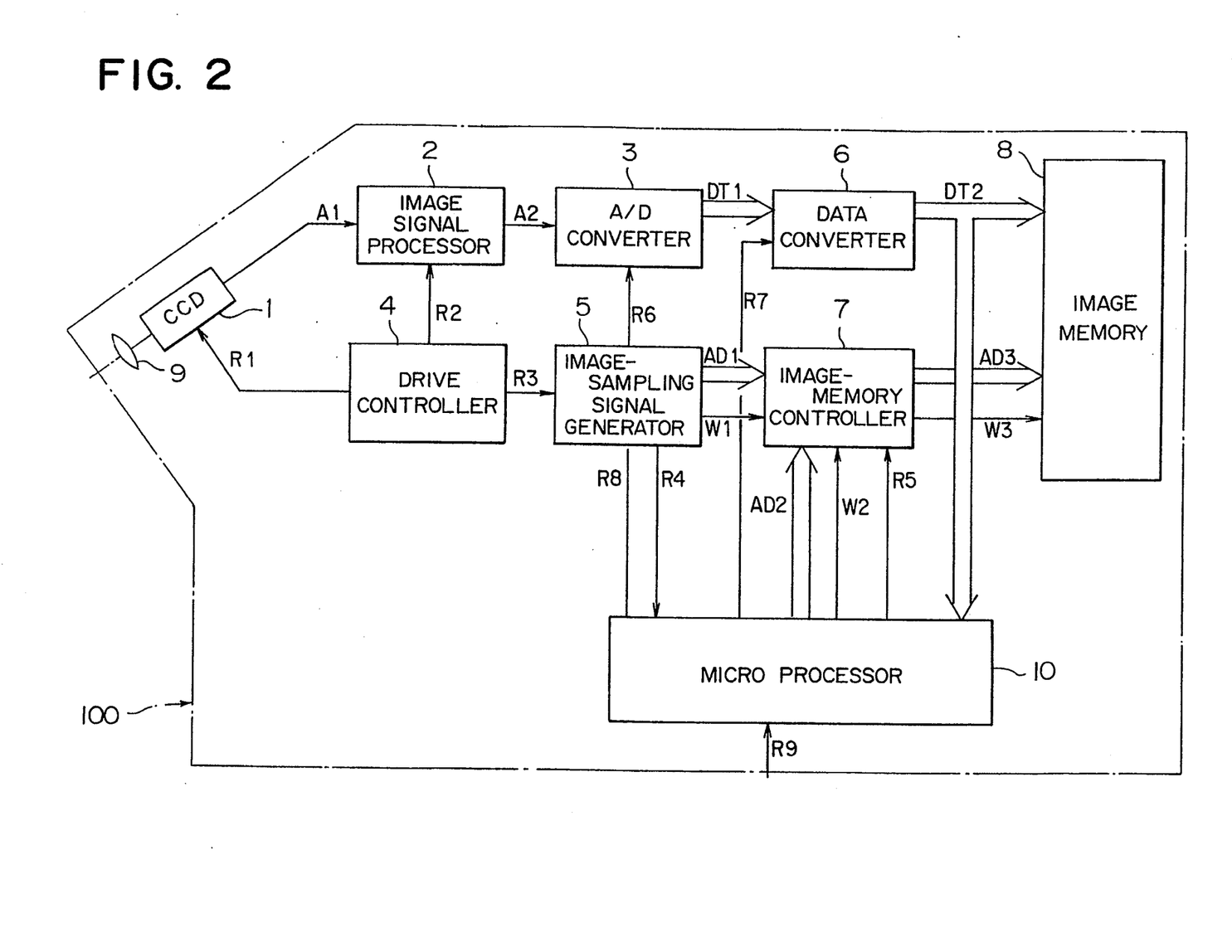
FIG. 2 is a block diagram showing the essential structure of the image reading apparatus of the present invention.
Figure 3A:
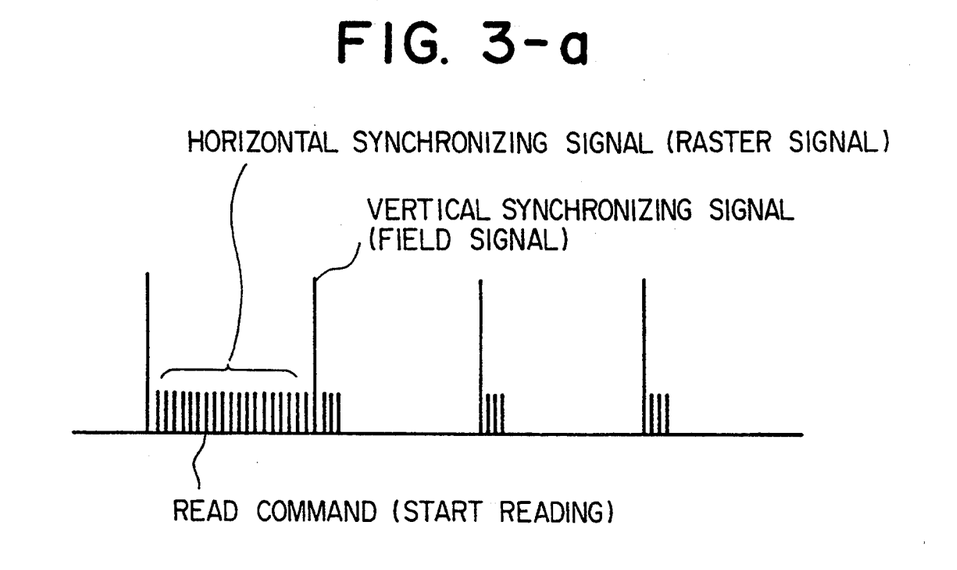
Figure 3B:
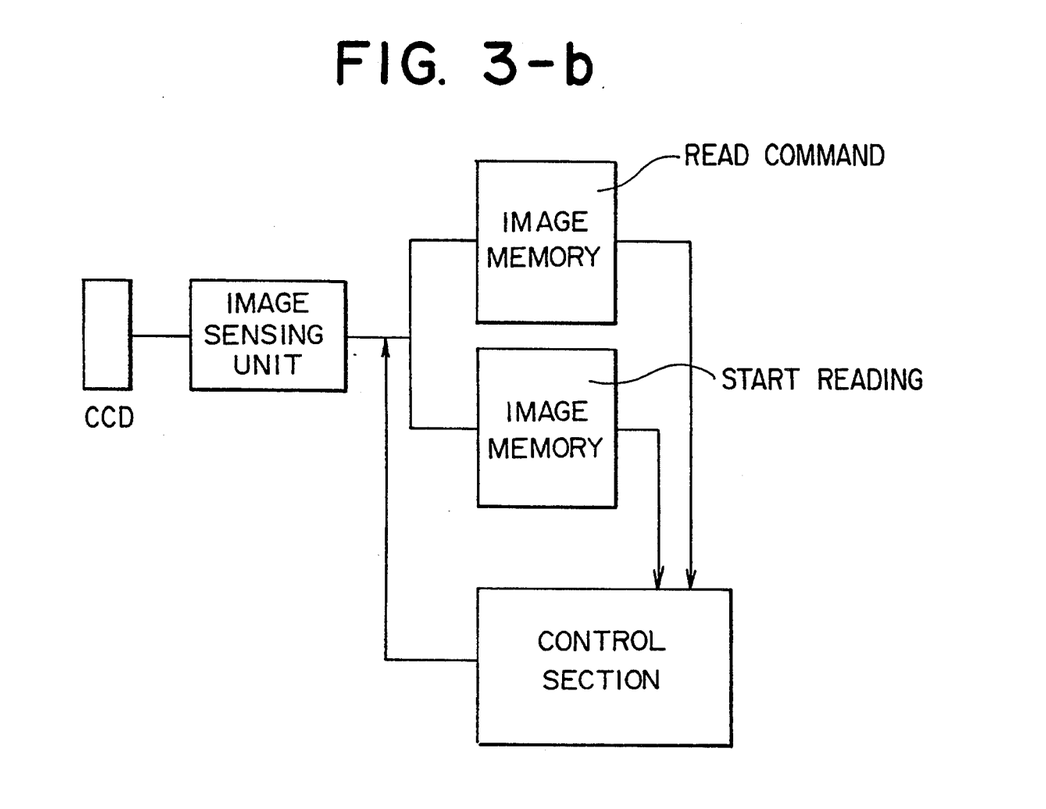
Figure 4A:
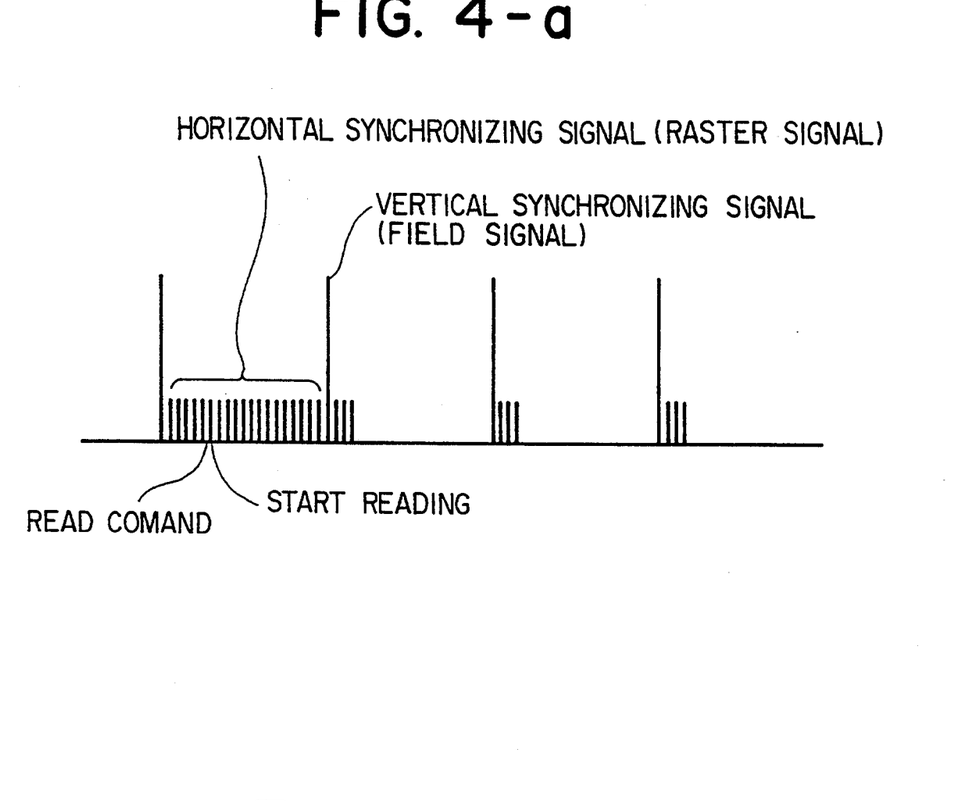
Figure 4B:
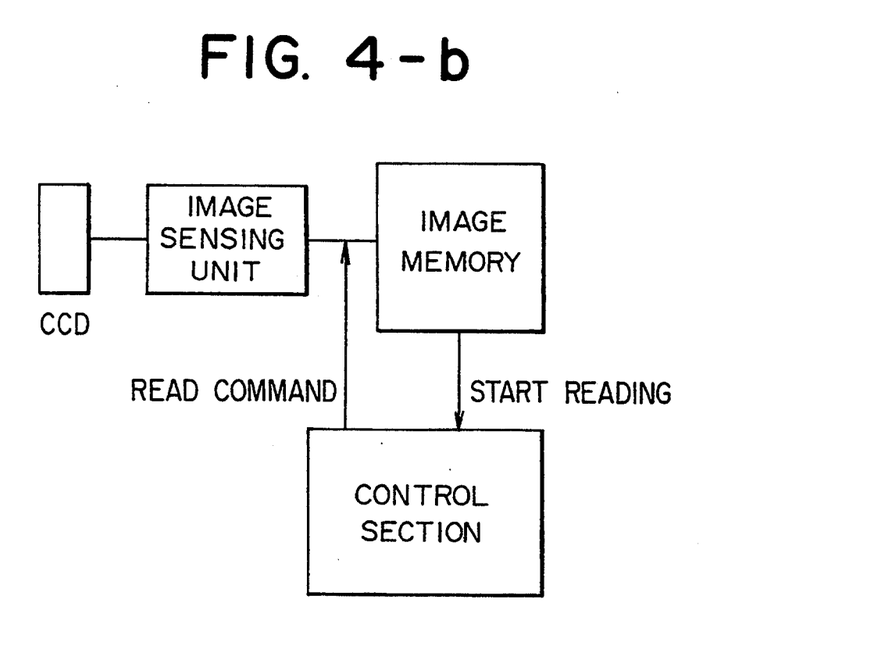
Figure 5A:
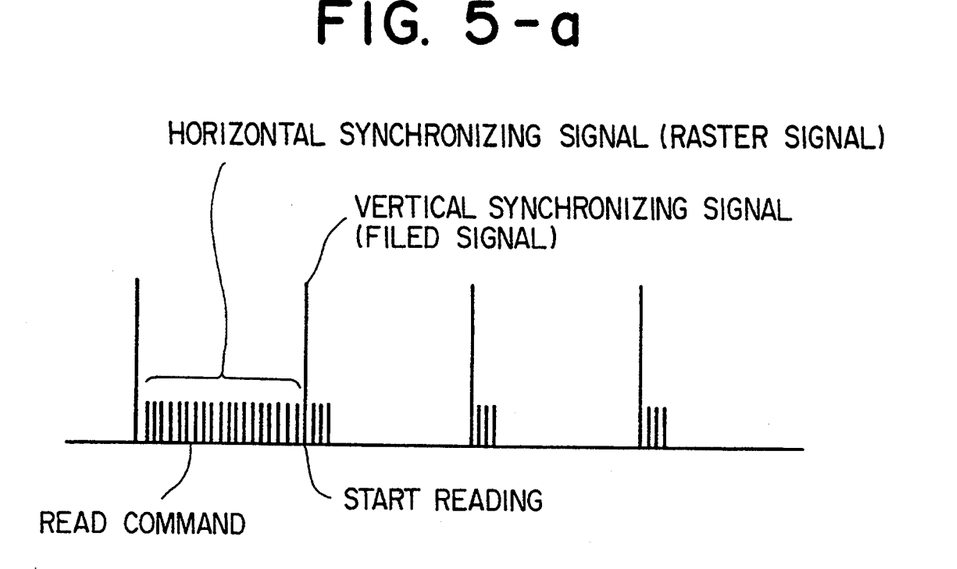
Figure 5B:
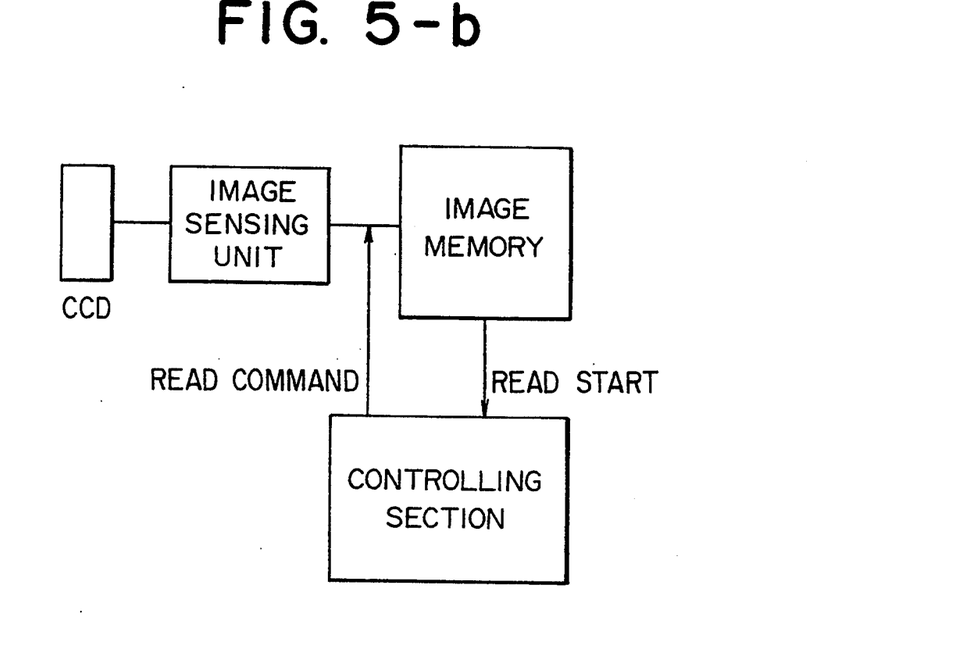

FIG. 1 is a schematic illustration showing the principle of a photographic printing apparatus 200 to which the image reading apparatus 100 of the present invention is applied. FIG. 2 is a block diagram showing the essential structure of the image reading apparatus 100 of the present invention. FIGS. 3-a and 3-b are schematic illustrations showing the principle of the first structure of the apparatus of the present invention. FIGS. 4-a and 4-b are schematic illustrations showing the principle of the second structure of the apparatus of the present invention. FIG. 5-a and 5-b are schematic illustrations showing the principle of the third structure of the apparatus of the present invention.

In FIGS. 1 and 2, light emitted from lamp K passes through mirror tunnel T and irradiates negative film F. Light which has been transmitted through negative film F, passes through an optical system 9 of the image reading apparatus 100, and an image is formed on a CCD1 so that an electrical charge corresponding to the intensity of transmitted light is generated on the CCD1.

Output of CCD1 is sent to an image signal processor 2 through an analog signal cable A1. In the signal processor 2, signal processing such as amplification is appropriately conducted. Numeral 3 is an A/D (analog/digital) converter. Output of the signal processor 2 is transmitted through an analog signal cable A2, and the signal is converted into a digital signal by the A/D converter 3. The digital signal is transmitted to a data converter 6 through a data bus DT1.

Numeral 4 is a drive controller. The drive controller 4 sends a timing signal for driving CCD1 to CCD1 through a signal cable R1. The drive controller 4 also sends an image processing signal to the image signal processor 2 through a control signal cable R2. In the aforementioned manner, CCD1 and the image signal processor 2 are controlled. The drive controller 4 further sends a clock and a synchronizing signal to an image sampling signal generator 5 through a control signal cable R3. When these signals are inputted into the image sampling signal generator 5, it sends an address signal to be stored in an image memory 8, to an address bus AD1. Further, the image sampling signal generator 5 sends a timing signal to be written in the image memory, to a writing-in control signal cable W1.

The data converter 6 conducts a LUT-conversion on the image data which has been digitalized by the A/D converter 3, in accordance with a LUT (Look UP Table) selection signal sent from a micro-processor 10 through a control signal cable R7.

An image memory controller 7 changes over image memory access signals sent from the image sampling signal generator 5 and the micro-processor 10 so that the sampling reading of image data can be controlled.

That is, the signals are sent to the image memory controller 7 through address buses AD1 and AD2, and writing-in control signal cables W1 and W2. In accordance with the selection signal sent from the micro-processor 10 through control signal cable R5, the image memory controller 7 sends a memory access signal and a writing-in control signal to the image memory 8 through the address bus AD3 and the writing-in control signal cable W3.

The micro-processor 10 is provided with a ROM (Read Only Memory) and a RAM (Random Access Memory) which are not shown in the drawing. A program accommodated in the ROM is carried out by the micro-processor 10.

EXPLANATIONS FOR ACTIONS OF THE PHOTOGRAPHIC PRINTING APPARATUS

Actions of a photographic printing apparatus to which the image reading apparatus of the present invention is applied, will be explained as follows.

After being diffused in mirror tunnel T, light emitted from lamp K irradiates negative film F put on negative film exposure stage N. Light which has been transmitted through a negative film, passes through a lens L and a dark shutter S, and then an image is formed on a photographic paper P for exposure. Three cut filters $C_1$, $C_2$ and $C_3$ (yellow (Y), magenta (M) and cyan (C)) are movably disposed between lamp K and mirror tunnel T. A photo-diode D to measure an amount of light of blue (B), green (G) and red (R) which has passed through negative film F, is disposed in a position close to exposure stage N.

When negative film F is set on exposure stage N and an operator presses an exposure button (not shown in the drawing), photo-diode D reads the LDTA values of the image and the image reading apparatus 100 reads the image in the manner of pixel-division, and the exposure time is determined at each color of B, G and R in accordance with the density of the negative film. After the exposure time has been determined, dark shutter S is opened, and transmitted light is projected onto a photographic paper P.

At this moment, the counting of the exposure time is started. When the counted time agrees with the exposure time of each color, a cut filter corresponding to the color is inserted. After the longest exposure time of the 3 colors has passed, dark shutter S is inserted into the optical path. In this manner, the exposure operation of 1 frame is completed. At this time, cut filters $C_1$, $C_2$ and $C_3$ inserted into the optical path are discharged from the optical path.

EXPLANATIONS FOR ACTIONS OF IMAGE TAKING

When the micro-processor 10 is reset, image memory counter CNT provided in RAM of the micro-processor 10 is set at 0, and the signal is sent to the image memory controller 7 through the control signal cable R5. This value is utilized as an upper value of the address in the case where the image memory is selected by the image memory controller 7.

In the same manner as described above, the micro-processor 10 controls the image memory controller 7 through the control signal cable R5 so that address buses AD1 and AD2 are connected, and writing-in control signal cables W1 and W3 are also connected. Due to the foregoing, the image memory controller 7 is set in the following manner: digital image data is written in the image memory in the 2 fields of image memories, the order of which is zero, using the address and writing-in control signals which are outputted from the image sampling signal generator 5. On the other hand, the micro-processor 10 commands the image sampling signal generator 5 to start sampling, through the control signal cable R8.

At the moment at which one field of sampling has been completed, the micro-processor 10 is interrupted by the control signal cable R4. Then, in the interruption processing routine, a value of (1−CNT) is substituted in image memory counter CNT. Since the previous value of CNT is 0, the value of CNT becomes 1 due to the foregoing operation. (On the contrary, when the previous value of CNT is 1, the value of CNT becomes 0.) The value of CNT is sent out to the image memory controller 7 through the control signal cable R5. Due to the foregoing, the image memory controller 7 is set so that data is written in the first memory which is one of the 2 fields of image memories. Further, the micro-processor 10 commands again the image sampling signal generator 5 to start sampling, through the control signal cable R8.

In the same manner as described above, the same interruption occurs each time 1 field of sampling operation is completed, and digital image information is stored in the image memories while the image memories are alternately changed over in this order: the 0th→the first→the 0th→the first→....

At a certain moment (for example, at a moment at which an operator presses the exposure button of a photographic printer) in which an exposure amount requesting signal is transmitted to the micro-processor 10 through the control signal cable R9, the micro-processor 10 disconnects the address bus AD1 from AD3 through the control signal cable R5, and also disconnects the writing-in control signal cable W1 from W3. Then, the micro-processor 10 sets the image memory controller 7 so that the address buses AD2 and AD3 are connected and further the writing-in control signal cables W2 and W3 are connected. After that, the value of image memory counter CNT is referred to, and digital image information is read out from the image memory, the order of which is (1−CNT). According to the obtained digital information, the exposure correction amount is determined with a well known calculation means.

After the exposure correction amount has been determined, the apparatus is initialized in the same manner as that conducted after resetting, and then 0 is substituted in image memory counter CNT provided in the RAM (not shown) of the micro-processor. The obtained value is sent out to the image memory controller 7 through the control signal cable R5. In the same manner, the image memory controller 7 is controlled through the control signal cable R5 so that address buses AD1 and AD2 are connected, and writing-in control signal cables W1 and W2 are also connected. Due to the foregoing, the image memory controller 7 is set again in the following manner: digital image data is written in the image memory in the 2 fields of image memories, the order of which is zero, using the address and writing-in control signals which are outputted from the image sampling signal generator 5. Finally, the micro-processor 10 commands the image sampling signal generator 5 to start sampling, through the control signal cable R8. Due to the foregoing, the apparatus is returned to the initial state again.

While address buses AD1 and AD3 are disconnected and writing-in control signal cables W1 and W3 are also disconnected, and while address buses AD2 and AD3 are connected and further writing-in control signal cables W2 and W3 are connected, new data is not taken in the image memory 8. However, there is plenty of time between the occurrence of an exposure amount request signal for a frame on a negative film and the occurrence of the next exposure amount request signal. Therefore, practically, problems are not caused when new data is not taken into the image memory 8 while the micro-processor 10 is finding the exposure correction amount.

IN THE CASE OF STRUCTURE 2

When a resetting operation is conducted on the micro-processor 10, 0 is substituted into both the exposure amount request pending flag and the sampling completion flag which are provided in the RAM of the microprocessor. At the same time, the image memory controller 7 is controlled through the control signal cable R5 so that address buses AD1 and AD3 are connected and writing-in control signal cables W1 and W3 are also connected. Due to the foregoing, the image memory controller 7 is set with the address and writing-in control signal which are outputted by the image sample signal generator 5, so that digital image information is written in the image memory. On the other hand, the micro-processor 10 commands the image sampling signal generator 5 to start sampling, through the control signal cable R8.

An image reading command is given when an interruption operation is conducted on the micro-processor 10 through the control signal cable R4 at a moment when 1 raster of sampling has been completed. That is, it is examined whether the exposure amount request pending flag becomes 1 or not in the interruption routine. In the case where this value is 0, the micro-processor 10 commands the image sample signal generator 5 to start sampling again, through the control signal cable R8.

In the same manner, the same interruption occurs each time 1 raster of sampling is completed. While the value of the exposure amount request pending flag is 0, the following raster sampling is repeatedly conducted. At this time, the address in which the sampled data is written, successively increases. Therefore, after 1 field of sampling has been completed, the address is cleared to zero. While the raster is successively changed over in the aforesaid manner, the digital image data is repeatedly stored in the image memory.

At a certain moment (for example, at a moment at which an operator presses the exposure button of a photographic printer) at which an exposure amount requesting signal is transmitted to the micro-processor 10 through the control signal cable R9, the micro-processor 10 substitutes 1 to the the exposure amount request pending flag. In the main routine, a polling operation is conducted so that the sampling completion flag becomes 1. In this case, in which the interruption processing which occurs concurrently with the completion of the next 1 raster of sampling, the exposure amount request pending flag is 1. Therefore, address buses AD1 and AD3 are disconnected using the control signal cable R5, and the writing-in control signal cables W1 and W3 are also disconnected. Then, the image memory controller 7 is set so that address buses AD2 and AD3 can be connected and the writing-in control signal cables W2 and W3 can be also connected. After that, 1 is set at the sampling completion flag so that the interruption processing is completed.

Meanwhile, in the main routine, the sampling completion flag on which polling has been conducted, becomes 1. Therefore, according to the digital image information stored in the image memory 8, the exposure correction amount is determined by a well known calculation means.

After the exposure correction amount has been determined, the apparatus is initialized again in the same manner as that conducted after resetting, and 0 is substituted into both the exposure amount requirement pending flag which has been set in the RAM of the microprocessor, and the sampling completion flag, and at the same time, the image memory controller 7 is controlled through the control signal cable R5, so that address buses AD1 and AD3 are connected and writing-in control signal cables W1 and W2 are connected. Due to the foregoing, the image memory controller 7 is set so that digital image data is written in the image memory using the address and the writing-in control signal outputted from the image sampling signal generator 5. On the other hand, the micro-processor 10 commands the image sampling signal generator 5 to start sampling, through the control signal cable R8.

While address buses AD1 and AD3 are disconnected and writing-in control signal cables W1 and W3 are also disconnected, and while address buses AD2 and AD3 are connected and further writing-in control signal cables W2 and W3 are connected, new data is not taken in the image memory 8. However, there is plenty of time between the occurrence of an exposure amount request signal for a frame on a negative film and the occurrence of the next exposure amount request signal. Therefore, practically, problems are not caused when new data is not taken into the image memory 8 while the micro-processor 10 is finding the exposure correction amount.

IN THE CASE OF STRUCTURE 3

When a resetting operation is conducted on the micro-processor 10, 0 is substituted into both the exposure amount request pending flag and the sampling completion flag which are provided in the RAM of the microprocessor. At the same time, the image memory controller 7 is controlled through the control signal cable R5 so that address buses AD1 and AD3 are connected and writing-in control signal cables W1 and W# are also connected. Due to the foregoing, the image memory controller 7 is set with the address and writing-in control signal which are outputted by the image sample signal generator 5, so that digital image information is written in the image memory. On the other hand, the micro-processor 10 commands the image sampling signal generator 5 to start sampling, through the control signal cable R8.

An image reading command is given when an interruption operation is conducted on the micro-processor 10 through the control signal cable R4 at the moment when 1 field of sampling has been completed. That is, it is examined whether the exposure amount request pending flag becomes 1 or not in the interruption routine. In the case where this value is 0, the micro-processor 10 commands the image sample signal generator 5 to start sampling again, through the control signal cable R8.

In the same manner, the same interruption occurs each time 1 field of sampling is completed. While the value of the exposure amount request pending flag is 0, the following field sampling is repeatedly conducted. In the aforementioned manner, digital image data is successively renewed in the image memory 8, and this operation is repeatedly conducted.

At a certain moment (for example, at a moment in which an operator presses the exposure button of a photographic printer) in which an exposure amount requesting signal is transmitted to the micro-processor 10 through the control signal cable R9, the micro-processor 10 substitutes 1 to the the exposure amount request pending flag. In the main routine, a polling operation is conducted so that the sampling completion flag becomes 1. In this case, in the interruption processing which occurs concurrently with the completion of the next 1 field of sampling, the exposure amount request pending flag is 1. Therefore, address buses AD1 and AD3 are disconnected using the control signal cable R5, and the writing-in control signal cables W1 and W3 are also disconnected. Then, the image memory controller 7 is set so that address buses AD2 and AD3 can be connected and the writing-in control signal cables W2 and W3 can be also connected. After that, 1 is set at the sampling completion flag and the interruption processing is completed.

Meanwhile, in the main routine, the sampling completion flag on which polling has been conducted, becomes 1. Therefore, according to the digital image information stored in the image memory 8, the exposure correction amount is determined by a well known calculation means.

After the exposure correction amount has been determined, the apparatus is initialized again in the same manner as that conducted after resetting, and 0 is substituted into both the exposure amount requirement pending flag which has been set in the RAM of the micro-processor, and the sampling completion flag, and at the same time, the image memory controller 7 is controlled through the control signal cable R5, so that address buses AD1 and AD3 are connected and writing-in control signal cables W1 and W2 are connected. Due to the foregoing, the image memory controller 7 is set so that digital image data is written in the image memory using the address and the writing-in control signal outputted from the image sampling signal generator 5. On the other hand, the micro-processor 10 commands the image sampling signal generator 5 to start sampling, through the control signal cable R8.

While address buses AD1 and AD3 are disconnected and writing-in control signal cables W1 and W3 are also disconnected, and while address buses AD2 and AD3 are connected and further writing-in control signal cables W2 and W3 are connected, new data is not taken in the image memory 8. However, there is plenty of time between the occurrence of an exposure amount request signal for a frame on a negative film and the occurrence of the next exposure amount request signal. Therefore, practically, problems are not caused when new data is not taken into the image memory 8 while the micro-processor 10 is finding the exposure correction amount.

According to the structure of the aforesaid embodiment, the timing of the start and end of sampling is adjusted using the interruption processing of the micro-processor. However, it should be understood that the present invention is not limited to the specific embodiments. When the hardware is capable to indicate the state of sampling, a busy-wait polling may be adopted.

In the aforesaid embodiments, the present invention is applied to a photographic printing apparatus, however, the present invention is not limited to the specific embodiment. The present invention can be applied to an automatic or manual negative film clasifying device.

EFFECTS OF THE INVENTION

As explained above, the present invention is to provide an image forming apparatus of the first structure, comprising an image sensing section which conducts an image sensing operation on a 2-dimensional scanned image, such as a film, at a regular period; a memory section which stores digital image information of the image which has been sensed; and a control section which gives a command of image reading to the memory, wherein 2 fields of image memory by which the image information can be alternately renewed, is provided in the memory section, and when a reading command is sent out from the control section, image information is read out from the image memory on which a writing operation is not being conducted. In the aforesaid manner, waiting time is substantially made to be zero during an image information reading process without using special expensive elements or circuits.

The present invention is to provide an image forming apparatus of the second structure, comprising an image sensing section which conducts an image sensing operation on a 2-dimensional scanned image such as a film at a regular period; a memory section which stores digital image information of the image which has been sensed; and a control section which gives a command of image reading to the memory, wherein 1 field of image memory by which the image information can be renewed at each raster, is provided in the aforesaid memory section, and when a reading command is sent out from the control section, the reading of the image memory is started in accordance with the sampling end signal of raster information which is being renewed. In the aforesaid manner, waiting time to read out image memory is made to be a period of time corresponding to sampling time of 1 raster at longest without using special expensive elements and circuits.

The present invention is to provide an image forming apparatus of the third structure, comprising an image sensing section which conducts an image sensing operation on a 2-dimensional scanning image such as a film at a regular period; a memory section which stores digital image information of the image which has been sensed; and a control section which gives a command of image reading to the memory, wherein 1 field of image memory by which the image information can be renewed at each field, is provided in the memory section, and when a reading command is sent out from the control section, the reading of the image memory is started in accordance with the sampling end signal of field information which is being renewed. In the aforesaid manner, waiting time to read out image memory is made to be a period of time corresponding to sampling time of 1 field at the longest without using special expensive elements and circuits.

The image memory is provided with an image information protection means which can be operated by the reading-out command, so that interference between the control section and the sampling means can be prevented.

The control section calculates an exposure amount or an exposure correction amount in the process of photographic printing according to the aforesaid digital image information so that the image processing speed can be increased in a photographic printing apparatus.

What is claimed is:

1. An image reading apparatus comprising:

image sensing means for repeatedly scanning an original image with a predetermined time interval between scans so as to obtain a set of image information data that represents the original image with each scan, the set of image information data including a plurality of line data which corresponds to a horizontal scanning line in the original image;

memory means coupled to said image sensing means for storing the image information data, said memory means having a memory area adapted to store one set of the image information data and which updates a stored set of the image information data stored in the memory area by writing newly obtained image information data from the image sensing means, line data by line data, over the stored set of image information data; and control means for issuing a command to the memory means to read out the set of image information data from the memory area, wherein the memory means starts to read out an image information data from the memory area at a time when both:

a horizontal synchronizing signal is sent from the control means, after completion of a currently occurring writing of a line of image information data into the memory area; and after the command from the control means has been issued.

2. The image reading apparatus of claim 1, further comprising:

data protection means for protecting the image information data in the memory area in response to the command from the control means.

3. The image reading apparatus of claim 1, wherein the control means further obtains, based on an analysis of the image information data, an exposure amount in printing a photographic image and a correction level to correct the exposure amount.

4. An image reading apparatus comprising:

image sensing means for repeatedly scanning an entire original image with a predetermined time interval between scans so as to obtain a set of image information data with each scan so that each set of image information data represents the entire original image;

memory means coupled to said image sensing means for storing the image information data, said memory means having a memory area adapted to store one set of the image information data and which updates a stored set of the image information data stored in the memory area by writing a set of newly obtained image information data from the image sensing means; and control means for issuing a command to the memory means to read out the image information data from the memory area, wherein the memory means starts a read out of an image information data from the memory area at a time when both:

a vertical synchronizing signal is sent from the control means, after completion of a currently occurring writing of a set of image information data into the memory area; and after the command from the control means is issued.

5. The image reading apparatus of claim 4, further comprising:

data protection means for protecting the image information data in the memory area in response to the command from the control means.

6. The image reading apparatus of claim 4, wherein:

the control means, based on an analysis of the image information data, further obtains an exposure amount for use in a printing of a photographic image and a correction level to correct the exposure amount.

* * * * *